J. C. FAULKNER.
SCALE.
APPLICATION FILED DEC. 28, 1914.
1,286,568.
Patented Dec. 3, 1918.
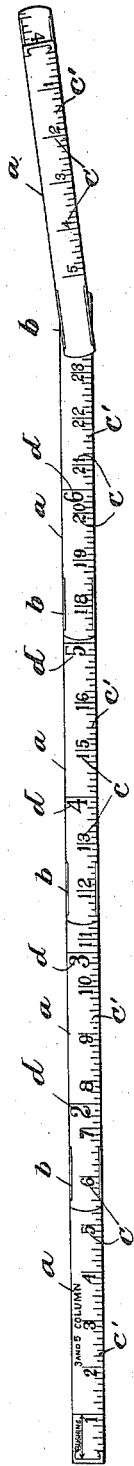
WITNESSES:
INVENTOR.
John C. Faulkner:
BY
ATTORNEY.

UNITED STATES PATENT OFFICE.

JOHN C. FAULKNER, OF BROOKLYN, NEW YORK.

SCALE.

1,286,568. Specification of Letters Patent. Patented Dec. 3, 1918.

Application filed December 28, 1914. Serial No. 879,262.

*To all whom it may concern:*

Be it known that I, JOHN C. FAULKNER, a citizen of the United States, and a resident of the city of Brooklyn, county of Kings, State of New York, have invented certain new and useful Improvements in Scales, of which the following is a specification.

This invention relates to improvements in scales and its object is to produce a scale which shall carry, in addition to the usual indications of long measurements, to wit, inches and fractions thereof, an additional series of indications arranged in fixed relation to the ordinary scale of inches, these additional indications denoting the measurement or size of the given number of units or pieces of some structure.

Another object of the invention is the provision of a scale embodying a hinged sectional rule having indications of measurements on opposite sides in different colors.

In the drawing forming a part of this application and in which like designating characters refer to corresponding parts throughout the several views, The figure is a top plan view partly extended of my improved scale.

In reference to the scale, it will be noticed that in connection with the usual scale of inches and fractions thereof, which indications do not extend across the face of the scale, there is found an additional series of indications which, in order to distinguish them from the other indications, are extended across the face of the scale, and these additional indications are numbered successively, the numerals indicating the number of unit sections, or pieces of an article whose length is that amount indicated. The scale shown in the drawing is of the usual folding type and includes a plurality of sections designated by $a$ joined together as at $b$ by a suitable hinge of any preferred length. The small numerals arranged across each face of each section are designated by $c$ and are successive numbers and this represents the preferred form of lineal measurements such as inches. The scale sections have indication lines $c'$ thereon which are arranged adjacent one edge of the scale sections $a$. Large numerals designated $d$ are provided on all of the sections $a$ and on opposite faces thereof and indicate the numbers of a given amount of units or pieces of a sectional structure, as the tubes of a radiator. It will be noted that the figures or numerals on one face of each section are in black letters while the numerals on the opposite face of the sections are in red numerals, this to permit the rule to be used for different numbers of units respectively, the black numerals being for the one and two column type radiator and the red being for the three and five column type radiator. With this description of the device, an example is cited as to the use and operation thereof.

For instance, in the work of setting up radiators of different sizes, the steam fitter having a five tube radiator of the three or five column type, takes his scale and using the red numeral side, takes his measurement for setting the supply and return pipes, etc., by finding the numeral five on the second set of indications which indicates that the radiator with its bushing is 17 inches long. And for any number of tubes, or sections, or units of a radiator, for instance, all he needs to know is the number of the tube, and then by looking at the second set of indications, he immediately has the total length of that radiator.

It will be understood that by this construction, applicant provides a double scale in a single instrument thus eliminating the necessity of the steam fitter resorting to catalogues, instruction sheets, etc., in carrying on his work, and enables him to proceed rapidly, and with certainty that there can be no mistake in his measurement.

I claim as my invention:

A rule having a plurality of hinged sections each section provided with long measure indications, said rule having a series of additional indicia extending along the successive sections to denote the number of the units in a structure, and also denoting by the positions of the indicia in relation to said long measure indications the extreme measurement or size of the indicated number of units or part of a structure.

JOHN C. FAULKNER.

Witnesses:
P. W. HARTWIG,
JOHN E. MASTERSON.

Copies of this patent may be obtained for five cents each, by addressing the "Commissioner of Patents, Washington, D. C."